United States Patent [19]

Matheson, III

[11] 4,347,165

[45] Aug. 31, 1982

[54] CONDUCTOR POWDERS

[75] Inventor: Neil Matheson, III, Garland, Tex.

[73] Assignee: Graham Magnetics, Inc., North Richland Hills, Tex.

[21] Appl. No.: 17,419

[22] Filed: Mar. 5, 1979

[51] Int. Cl.$^3$ .............................................. H01B 1/02
[52] U.S. Cl. .................................. 252/513; 252/511; 252/512; 252/516; 252/518; 252/519; 75/0.5 B; 428/403; 428/335; 428/627; 428/328; 427/216; 427/228; 523/200; 524/404; 524/428; 524/435
[58] Field of Search ............... 252/513, 512, 518, 516, 252/519, 511; 428/403, 402, 404, 539, 334, 335, 627, 628, 328, 331, 900; 260/42.14, 42.22, 37 M; 75/0.5 B, 0.5 BA, 0.5 BB, 203–205; 360/134; 148/105; 106/288 R, 309; 427/215, 216, 228, 249, 217

[56] References Cited

U.S. PATENT DOCUMENTS

| | | | |
|---|---|---|---|
| 3,846,345 | 11/1974 | Mason et al. | 252/513 |
| 4,092,459 | 5/1978 | Deffeyes et al. | 428/403 |
| 4,130,854 | 12/1978 | Hertz | 252/513 |
| 4,137,361 | 1/1979 | Deffeyes et al. | 252/513 |
| 4,155,896 | 5/1979 | Rennier et al. | 252/513 |
| 4,218,507 | 8/1980 | Deffeyes et al. | 252/513 |

*Primary Examiner*—Joseph L. Schofer
*Assistant Examiner*—J. L. Barr
*Attorney, Agent, or Firm*—Andrew F. Kehoe

[57] ABSTRACT

Nickel powders having an improved chemical stability are formed by reaction with an electroconductive coating such as a carbide, a silicide, or the like and, also, a reaction with sulfur.

5 Claims, No Drawings

CONDUCTOR POWDERS

BACKGROUND OF THE INVENTION

This invention relates to an improved process for imparting an improved corrosion-resistant property to particles having metal surfaces. In particular, the invention relates to a means to achieve an improved combination of good chemical resistance and good electroconductivity on metallic particles. The invention also relates to the novel products formed by the aforesaid process and to novel conductive paint compositions utilizing said products.

It has long been a problem to provide electrically-conductive particles which have good corrosion resistance. One approach to such particles is described in U.S. Pat. Nos. 4,092,459 and 4,137,361 to Robert J. Deffeyes. Deffeyes discovered that carbiding the surface of, say, a nickel powder provided a nickel powder of good conductivity and good chemical resistance.

Takahasi in U.S. Pat. No. 3,904,448 have described a thin coating of nitride on a metallic powder product. The coating offered good corrosion resistance but had relatively poor electroconductive properties. The present inventor has discovered a way to further improve the particle-treating processes of the general type described by such inventors. Such particles find exceptional value in the formation of coating compositions for electroconductive, or electromagnetic-shielding applications.

SUMMARY OF THE INVENTION

It is a principle object of the invention to provide electroconductive particles with an improved combination of electroconductivity and good chemical resistance.

Another object of the invention is to provide an improved process for the purpose of making electrically-conductive particles having an exceptionally good combination of initial electroconductivity and good resistance to decay of that electroconductive property.

A further object of the invention is to provide an improved electroconductive particle of nickel of the type wherein an electrically-conductive carbon compound is present on the surface of the particles.

A further object of the invention is to provide improved electroconductive coating compositions.

Other objects of the invention will be obvious to those skilled in the art on their reading of this disclosure.

The above objects have been substantially achieved by combining with a carbiding, siliciding, nitriding or other protective treatment, a treatment of metal particles with a carefully selected quantity of sulfur compound. A synergistic effect is achieved whereby the presence of the sulfur atoms on the surface of the particles aids to increase the corrosion resistance of the particles, as measured in terms of loss of electrical conductivity, without interfering with good initial electroconductivity.

In the preferred embodiment of the invention, the conductive powder is nickel, or iron, or cobalt. However, it is always an electroconductive metal and the coatings, e.g. the carbide or silicide thereof are also electrically conductive.

Among the metal powders which may be treated according to the invention are nickel, cobalt, iron, manganese, chromium, molybdenum and the like, i.e. those metals of good electroconductive properties and which form electrically conductive silicides, borides or nitrides or oxides and, most favorably, carbides.

It is desirable to treat the metal powder to be processed with a reducing agent, for example, hydrogen gas, before the process of the invention is carried out.

The particles of the invention are generally those having an average diameter of about 0.5 to 40 microns, i.e. those having a high surface area per unit weight. The articles may be rod-shaped, flake-shaped or spherical.

The amount of sulfur used must be carefully controlled. Too much sulfur inhibits the desirable electroconductivity of the particles. Among the organosulfur compounds which are useful are 1-dodecanethiol; dithiobisteropropionate and octadecyl 3-mercaptopropionate. Since the process is operated at elevated temperatures, care should be taken to avoid compounds which will distill off from the reaction medium taking sulfur with them.

The preferred reaction medium should be a sulfur-free oil. Care should be taken in making this selection and an oil which has been acid washed is preferred. A mineral oil sold under the trademark Primol 355 by Exxon is one suitable liquid medium for carrying out the process of the invention.

In the process of the invention, a predetermined quantity of sulfur will be added to a liquid environment within which the conductive metal surface to be coated will be subjected to a primary reaction gas, e.g. carbon monoxide which will form a carbide on the metal. Other primary reactants can contribute silicon, nitride, etc. all as known in the art and disclosed in, e.g. U.S. Pat. Nos. 4,137,361 and 3,904,448.

The reactant is advantageously a gas which will contribute carbon to the coating to be placed on the metal surface. For example, carbon monoxide or methane is a good source of carbon. However, it has been found that the corrosion resistance of, say, a carbided surface can be markedly enhanced if a pre-determined amount of sulfur is added to the liquid medium. For example, organosulfur compounds are believed to be of particular value when a mineral oil is used as the liquid reaction environment.

ILLUSTRATIVE EXAMPLES OF THE INVENTION

In this application there is shown and described preferred embodiments of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it, each as may be best suited in the condition of a particular case.

EXAMPLE 1

The following process was carried out in an agitated electrically-heated reactor of nominal 35-gallon capacity.

The reactor is purged with nitrogen as the reactor is being heated. Then one hundred lbs. of nickel flake, e.g. that sold under the trade designation Nickel UFNL by Novamet Inc. of Waldwick, N. J., is uniformly dispersed into a white mineral oil sold under the trade mark Primol 355 by Exxon Corp. The final volume of the metal-in-oil slurry is about 25 gallons.

To the slurry, as the sole source of sulfur, is mixed 0.8 lbs of 1-dodecanethiol. The nitrogen purge is continued throughout these steps and for 30 minutes thereafter. Then the reactor is sealed and the pressure is increased to 500 psig. A high-pressure source of nitrogen is used to achieve this pressure in the reactor over the slurry. Thereafter, the nitrogen is replaced with hydrogen gas and a small flow of hydrogen is maintained through the reactor at 500 psig. After the reactor reaches 400° F., (in this case a period of about 1 hour after the hydrogen atmosphere has been established), the slurry is agitated for a period of about four hours at 400° F. (All gases are bubbled into the autoclave from the bottom)

Thereupon, the hydrogen gas is replaced with methane gas. The methane gas flow is continued for another four hours after which the heat is turned off and the methane gas flow is replaced with nitrogen.

The nitrogen purge is continued until the gas discharging from the reactor is no longer flammable. (It is convenient to burn the off-gas as a flare, and the off-gas may be considered to be non-flammable when only the pilot light is burning at the flare)

When the slurry cools to about 200° F., it is dumped through a heat exchanger to remove more heat and thence into a hold tank wherein the treated metal product is allowed to settle out. Thereupon, the liquid is decanted off, and the product is washed with perchloroethylene. Next the nickel is reslurried in clean solvent, filtered and dryed.

After being sieved through a 400 mesh sieve, the treated metal is ready for use, e.g. as a corrosion-resistant material in the use of electroconductive paints and the like.

The nickel flake utilized is believed to be made by nickel carbonyl reduction process and has an average particle size of about 1 micron. The finished flake averages about 0.1 micron thick and about 2-8 microns in diameter. The product has a surface area of about 0.4 square meters per gram by B.E.T. analysis based on the absorbtion of nitrogen.

The powder is dispersed into a test formulation comprising 80% by weight of powder to, 20% by weight of acrylic binder, plus enough solvent to reduce the viscosity of the composition comprising the powder and the liquid vehicle to about 22 seconds on a No. 2 Zahn cup. This mixture is about 50% solids. The resulting paint is sprayed with a Binks No. 19 spray gun to form a coating of paint 2 mils thick on a 7 mil polyester film. The initial conductivity of the paint is about 0.75 ohm per square. Results as low as 0.5 ohms per square have been achieved. Resistivities of below 1.5 ohms per square are usually achieved and considered to be "in specification" although paints of higher resistivity, e.g. 10 ohms per square are very useful in many applications.

The painted strip of polyester is placed in an environmental chamber at 160° F. and 50% relative humidity for 120 hours. Then the conductivity is measured again. Typically, the resistivity rises to 2.50 ohms per square, but 5 ohms is suitable. When the same process is run without the sulfurizing, the material degrades faster as measured by the measured by electroconductivity of the paint. For example, it will typically rise to about 100 ohms per square. (If one uses only the sulfur step and eliminates the carbiding step, the same undesirable rise in resistivity occurs)

EXAMPLES 2-3

Example 1 was repeated but, instead of using 1-dodeconethiol, dithiobisteropropionate and octadecyl 3-mercaptopropionate were used in Examples 2 and 3, respectively. These materials were used in 0.001548 sulfur-to-nickel weight ratio. In each case an electrically-conductive material of superior corrosion resistance was obtained.

EXAMPLE 4

Example 1 is repeated using iron. A conductive, corrosion resistant iron-based powder is obtained.

EXAMPLE 5

Example 1 is repeated using cobalt. A conductive, corrosion-resistant cobalt powder is obtained.

It is also to be understood that the following claims are intended to cover all of the generic and specific features of the invention herein described and all statements of the scope of the invention which might be said to fall therebetween.

What is claimed is:

1. An electroconductive paint product, containing electroconductive metal particles in a liquid vehicle, said particles being present in a quantity effective, upon solidification of said paint, to be in particle-to-particle contact with one another, and wherein said particles have a stabilized electroconductive surface comprising
   (a) a first reaction product of said electroconductive metal with an electroconductive carbide, nitride, boride or silicide and, also,
   (b) an effective amount of second reaction product of said electroconductive metal with sulfur to form means to improve the stability of the electroconductivity of a coating formed of said paint to moisture and heat.

2. A paint as defined in claim 1 wherein said first reaction product is a carbide and wherein said metal is nickel.

3. A paint product as defined in claim 1 wherein said metal is iron, nickel or cobalt.

4. A solidified paint product comprising an effective quantity of particles having a stabilizing electroconductive surface as defined in claim 1, 2 or 3 and further characterized by an initial resistivity of less than 10 ohms per square when said particles are loaded into a 2-mil coating of said paint at 80% by weight.

5. A paint as defined in claims 1, 2, or 3 wherein the stabilized powder has an average particle diameter of from 0.5 to 40 microns and is characterized by the ability to impart a resistivity of 1.5 ohms per square or less when distributed at 80% by weight leading, in a 2-mil thick coating of polyacrylate binder.

* * * * *

UNITED STATES PATENT AND TRADEMARK OFFICE
CERTIFICATE OF CORRECTION

PATENT NO. : 4,347,165
DATED : August 31, 1982
INVENTOR(S) : Matheson, III

It is certified that error appears in the above-identified patent and that said Letters Patent are hereby corrected as shown below:

Column 2 and Column 4, lines 15-16 and 11, respectively, "dithiobisteropropionate" should be --dithiobistearyl propionate--

Column 4, line 3, delete the second occurrence of "measured by."

Signed and Sealed this

Tenth Day of January 1984

[SEAL]

Attest:

GERALD J. MOSSINGHOFF

Attesting Officer

Commissioner of Patents and Trademarks